United States Patent
Gibbs

(10) Patent No.: US 7,666,041 B2
(45) Date of Patent: Feb. 23, 2010

(54) AMPHIBIOUS VEHICLE COOLING SYSTEMS

(75) Inventor: Alan Timothy Gibbs, London (GB)

(73) Assignee: Gibbs Technologies, Inc., Auburn Hills, MI (US)

(*) Notice: Subject to any disclaimer, the term of this patent is extended or adjusted under 35 U.S.C. 154(b) by 0 days.

(21) Appl. No.: 10/513,384

(22) PCT Filed: Apr. 28, 2003

(86) PCT No.: PCT/GB03/01837

§ 371 (c)(1),
(2), (4) Date: Aug. 1, 2005

(87) PCT Pub. No.: WO03/093037

PCT Pub. Date: Nov. 13, 2003

(65) Prior Publication Data

US 2005/0272324 A1 Dec. 8, 2005

(30) Foreign Application Priority Data

May 3, 2002 (GB) .................... 02103232

(51) Int. Cl.
*B63H 21/14* (2006.01)
*F01P 3/20* (2006.01)
*F02B 61/04* (2006.01)
*B63H 21/10* (2006.01)
*B63H 21/38* (2006.01)

(52) U.S. Cl. .................. 440/88 C; 440/88 R

(58) Field of Classification Search ............... 440/12.5, 440/12.51, 12.52, 12.53, 12.54, 12.55, 12.56, 440/12.57, 88 R, 88 A, 88 B, 88 C, 88 D, 440/88 G, 88 J, 88 K, 88 M, 88 N, 88 HE, 440/88 P, 88 T See application file for complete search history.

(56) References Cited

U.S. PATENT DOCUMENTS

| | | | | |
|---|---|---|---|---|
| 2,341,165 A | * | 2/1944 | Thayer Todd Edwin ... | 440/88 R |
| 3,266,591 A | * | 8/1966 | Sampietro Achilles et al. | 180/68.1 |
| 3,763,953 A | * | 10/1973 | Yoda et al. ................. | 180/68.4 |
| 4,730,664 A | * | 3/1988 | Forsthuber et al. ............ | 165/41 |
| 5,417,177 A | * | 5/1995 | Taguchi et al. ............. | 440/12.5 |
| 5,690,046 A | | 11/1997 | Grzech, Jr. | |
| 5,752,862 A | * | 5/1998 | Mohler et al. ................. | 440/38 |
| 2002/0005269 A1 | * | 1/2002 | Meek .......................... | 165/42 |

FOREIGN PATENT DOCUMENTS

| DE | 10026047 A1 | * | 11/2001 |
|---|---|---|---|
| EP | 0492655 A1 | * | 7/1992 |
| GB | 2182008 A | * | 5/1987 |
| GB | 2363453 A | * | 12/2001 |
| GB | 2388184 A | * | 5/2003 |

OTHER PUBLICATIONS

International Search Report for PCT/GB03/01837.

* cited by examiner

*Primary Examiner*—Daniel V Venne
(74) *Attorney, Agent, or Firm*—Calfee Halter & Griswold LLP

(57) ABSTRACT

Planing amphibious vehicle (101) comprises engine (105) with internal cooling ducts (106). The engine is cooled first by air-water exchanger (102), and secondly by water-water exchanger (108). One or both exchangers may be located in compartment (119), separated from engine compartment (117) fully by bulkhead (80) (FIG. 4), or partially by bulkheads (118, 120). External water for exchanger (108) is drawn in from outside hull (109) through jet intake (114), the through inlet (115) in jet drive duct (116); and exhausted through outlet (123). Compartment (119) may also contain exhaust silencer (121). Numerals (103 and 104) denote grilles; (107) denotes cooling fan(s). FIG. 2 shows an alternative arrangement, with external water drawn from beneath the hull by pump (32). FIG. 1 shows front mounted radiator (2), covered by external flap (4) allowing air cooling to be shut down on water. FIG. 3 shows a water-water exchanger combined with the marine jet drive.

23 Claims, 3 Drawing Sheets

AMPHIBIOUS VEHICLE COOLING SYSTEMS

CROSS REFERENCE TO RELATED APPLICATIONS

The present application is the U.S. national phase entry of PCT/GB03/01837 with an international filing date of Apr. 28, 2003 and claims priority from GB Patent Application Serial No. 0210323,2, filed May 3, 2002.

FIELD OF THE INVENTION

The present invention relates to the cooling of internal combustion engines in amphibious vehicles, hereafter called amphibians; particularly for planing amphibians. The term external water is used to define water drawn in from outside the amphibian for cooling purposes; whereas the term internal water is used to denote water circulating entirely and solely within the amphibian for cooling purposes.

BACKGROUND OF THE INVENTION

Inboard mounted internal combustion engines used to drive small marine craft are almost invariably directly cooled by water. This is pumped from the water around the craft directly via a filter through the engine block and thence overboard. This may necessitate measures to prevent internal corrosion of the engine.

Land vehicles, apart from a few which are air cooled, employ indirect means whereby liquid coolant is circulated through the engine block from and back to a heat exchanger, that is a radiator, which is cooled by air directed through the exchanger.

The problem with amphibians is that the sole provision of direct water cooling is not feasible because the vehicle may be on land, and air intakes for indirect cooling radiators cannot always be located in convenient positions. Furthermore, the difficulty of mounting a radiator in a convenient position may result in precious space being taken up by air ducts or fans or both.

External water-water heat exchangers have been tried on amphibians, but have two notable drawbacks. One is that they are susceptible to damage, particularly from foreign objects; the other is that they inhibit marine performance and reduce hydrodynamic efficiency by breaking up the otherwise smooth contour of the underside of the hull.

SUMMARY OF THE INVENTION

A planing amphibian engine cooling system according to the invention comprises liquid coolant ducting for circulating the coolant around the engine, a heat exchanger connected to the ducting and arranged so that air may be passed from an air inlet through the first exchanger to cool the coolant circulated around the engine, and a second heat exchanger connected to the dust and arranged so that external water may be passed through a water inlet on the underside of the hull from outside the hull to inside the hull, then through the second exchanger to cool the coolant, the water inlet being within the rear two thirds of the length of the hull. The invention also comprises an amphibian having the above system.

The arrangement of the invention is such that when the vehicle is in the water, air cooling arrangements may be closed down whereby air intakes may be shut to protect air cooled heat exchangers. This will not only protect the heat exchanger matrix from foreign object damage, but also prevent external water flooding the radiator compartment and affecting vehicle handling and stability. Furthermore, unlike the arrangements in U.S. Pat. No. 4,730,664 (Forsthuber et al), the heat exchanging can be compact with an air cooled exchanger located near upper intakes and a water cooled exchanger located as low down in the vehicle as possible to ensure good stability in the water. The location of the water inlet within the rear two thirds of the length of the hull ensures that as the vehicle moves from displacement mode to planing mode, there is a continuous flow of cooling water ensured by the presence of a small pressure greater than atmospheric pressure.

Whilst it would theoretically be attractive to change from indirect to direct cooling when entering the water, there would be a difficult and critical time at the tune of entry where air ducts were prone to damage and yet water cooling was not available due to incomplete entry. For simplicity and safety, it is therefore preferred to employ indirect cooling for both land and water modes. This also allows retention of antifreeze with its associated corrosion inhibitors in the engine coolant ducting, to protect the engine during winter storage and/or driving of the amphibian.

Preferably a cooling water pump is provided to circulate water from outside the amphibian of the invention through the second heat exchanger to avoid reliance on air cooling through the first exchanger whilst the amphibian is stopped. Alternatively, external water may be arranged to be taken from the pressurized side of a marine jet drive to the second heat exchanger. This saves the weight and cost of a discrete cooling water pump used specifically to feed the second exchanger.

A second alternative arrangement comprises a second heat exchanger combined with the marine jet drive. This could be in the form of a jacket for internal water surrounding the jet drive. In addition, cavities in the jet drive hub and/or stator blades may be used, as described in our co-pending application, GB2,363,453A, the contents of which application are incorporated herein by means of reference. This arrangement has the advantage of not requiring any external water plumbing within the vehicle, other than the jet drive itself. Furthermore, the entire trust of the jet unit is available for vehicle propulsion, without any pressure being used for circulating water within the vehicle.

In one embodiment of the invention, the first exchanger is mounted in the front of the vehicle behind an air intake located above the vehicle static water line. This is particularly suitable for a planing amphibian, where the bow will ride higher in the water than that of a displacement vehicle. Alternatively, the first exchanger may be located behind closure means comprising one or more closable flap(s). The flap or flaps not only protect the exchanger from the surrounding water when the vehicle is travelling fast, but also from flotsam. The flap(s) can be provided with a simple hinged opening and closing arrangement.

Fast amphibians require a water inlet to be nearer the stern. For example, a planing amphibian will require the water inlet to be in the back half of the hull. For best results when the vehicle is tramping, it has been found that the water inlet should preferably be located between 60% and 95% of the distance from front to back of the waterline on the plane, and more preferably between 70% and 90% of the distance from front to back. A water inlet in such a location beneath the hull is placed near the centre of pressure for a planing vehicle, thus ensuring a plentiful supply of water.

Embodiments of the invention will now be described by way of example with reference to the accompanying drawings in which:

DETAILED DESCRIPTION OF THE INVENTION

In all of these figures, the road wheel and marine transmissions have been omitted for clarity, as have various brackets and supports; exhaust piping and electrical wiring; the radiator header tank and any oil coolers fitted. These parts will clearly be necessary for the functioning of the amphibian, but do not form part of the invention, and therefore will not be described in detail. In all cases, a filter (not shown) may be fitted to the water inlet for the second exchanger, to protect said exchanger from blockage and/or damage by foreign objects. Furthermore, components have been shown in such orientations as to make the figures clear, and therefore may in practice be in alternative alignments for functional or packaging reasons.

Although the general principles of the invention could be applied to amphibians with front-, mid-, or rear-mounted engines, and with either displacement or planing hulls, they will be described with particular reference to a mid-engined planing amphibian.

Figure 1:
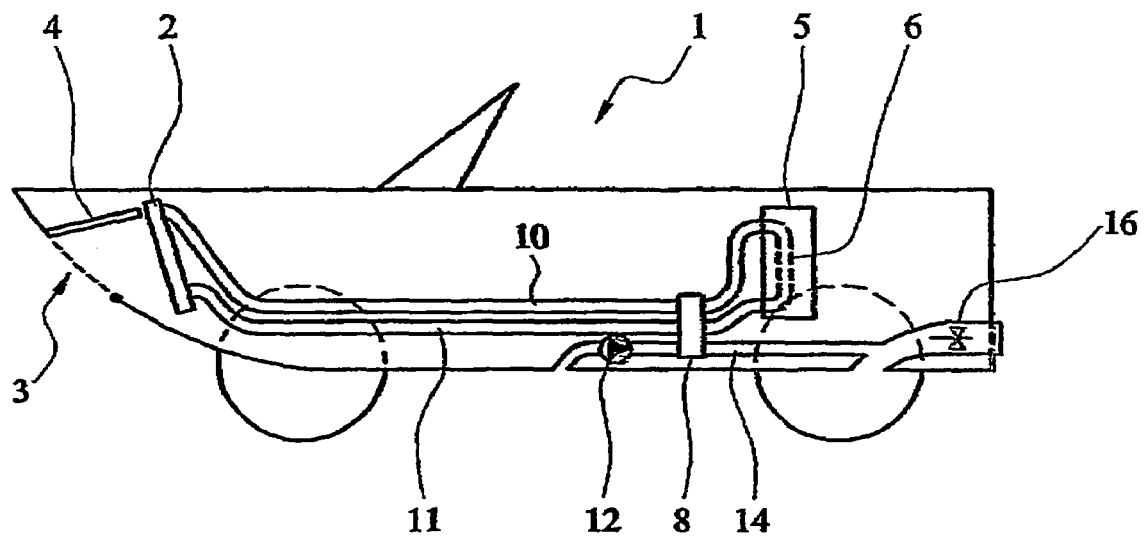
FIG. 1 is a diagrammatic side elevation of an amphibian with a radiator in the front.

In FIG. 1, where the amphibian generally shown at 1 is mid-engined, a first heat exchanger (i.e. radiator) 2 is located behind an air inlet 3, which may be closed by means of a hinged flap 4. The engine 5 has internal coolant ducting represented schematically by broken lines 6. Ducting 6 is connected to the first heat exchanger 2 via a second heat exchanger 8 and piping 10, 11. The second heat exchanger 8 is cooled by water pumped by pump 12 through piping 14 venting into pump jet duct 16. First exchanger 2 is ideally located to take advantage of forward movement when on land, but requires the closure flap 4 and lengthy piping 10, 11.

Figure 2:
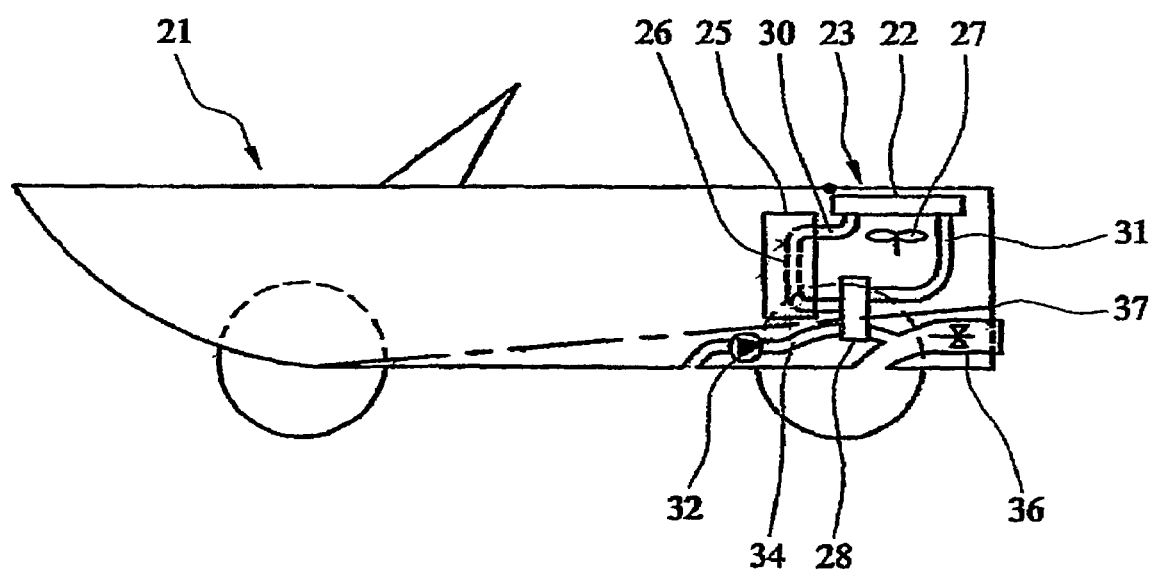
FIG. 2 is a diagrammatic side elevation of an amphibian with a radiator at the rear.

FIG. 2 shows a cooling system in which engine 25 for vehicle 21 is cooled in the same way as the previous embodiment, except that first exchanger 22 is located at the rear of the vehicle enabling piping 30 connecting exchanger 22 to engine ducting 26 to be shortened. Pipe 31 connecting first exchanger 22 to second exchanger 28 is likewise shorter than pipe 11 in the first embodiment. The water for second exchanger 28 can be fed by piping 34, venting as before into pump jet duct 36. Numeral 23 denotes a radiator grille. A fan 27 is shown in schematic form. A typical water line for planing is shown at 37.

Figure 3:
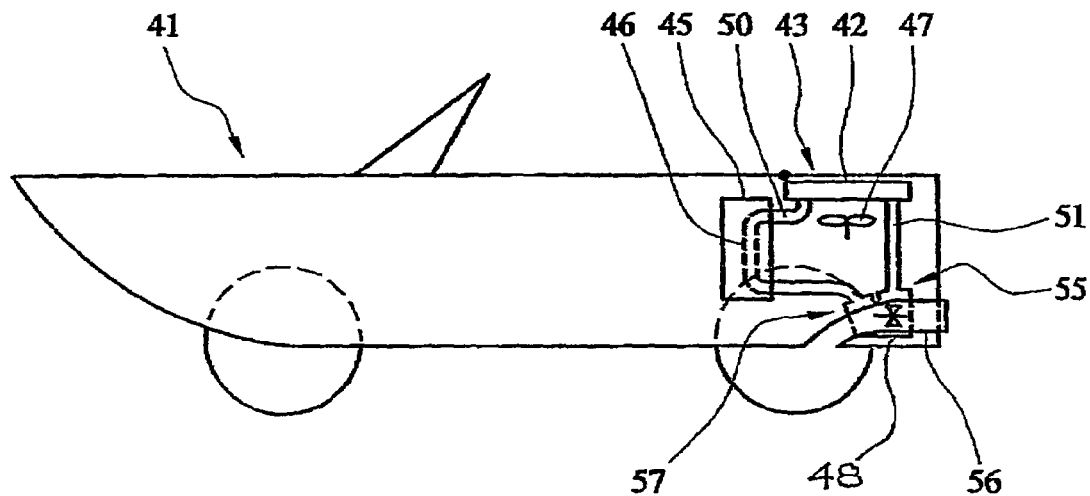
FIG. 3 is a diagrammatic side elevation of an alternative layout of an amphibian with a radiator at the rear.

FIG. 3 shows a cooling system in which engine 45 for vehicle 41 is cooled in the same way as the previous embodiment, by a first exchanger located at the rear of the vehicle. In this case, pipe 51 connects first exchanger 42 to second exchanger 48, which is arranged as a jacket around marine jet drive 56. As shown in the figure, this jacket is arranged to drive water around the outside of jet drive 56 from port 55 to port 57, without taking a short cut straight across from one port to the other. It will be seen that there is no pump in this arrangement other than the engine water pump, which may require to be upgraded to cope with the longer water pipes.

Figure 4:
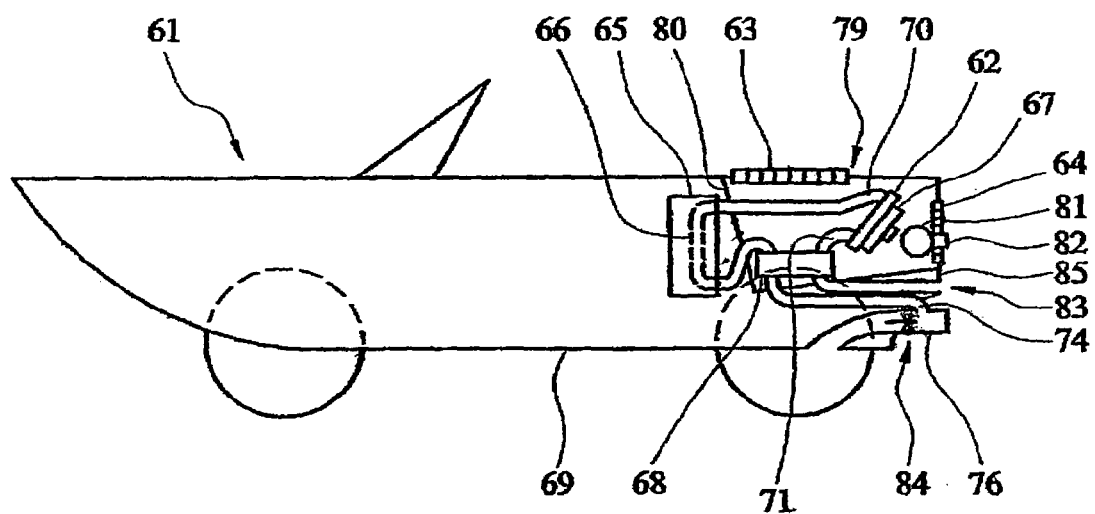
FIG. 4 is a diagrammatic side elevation of a further alternative layout of an amphibian with a radiator at the rear.

FIG. 4 shows a further amphibian where the first exchanger is located in a second compartment separate to the engine compartment, as described in the applicant's co-pending application, published as WO 02/070289. Amphibian 61 has a mid-mounted engine 65 with cooling ducting 66. First exchanger 62 and second exchanger 68 are located in a compartment 79, which separated from the engine by a bulkhead 80. Air passes into compartment 79 through grille 63, through exchanger 62, past one or more exhaust silencers 81, and out through further grille 64. Air flow may be assisted by one or more fans 67. Although it is not essential that exchanger 68 is located in compartment 79, this may be convenient for assembly and routing of water pipes. Exhaust silencer 81 is also located in compartment 79, and has a tailpipe 82 passing through grille 64. The back part of the amphibian hull 69 is cut away at 84 to allow fitment and operation of trim tabs, also the steering nozzle (not shown) and reversing bucket (where fitted) for the jet drive. In the embodiment shown, water is first drawn into the hull through the jet drive intake below the hull, then tapped off from the pressurized side of the jet through inlet pipe 74 in jet pump duct 76. As can be seen from the figure, inlet pipe 74 is initially outside the hull, but passes through it. The external water outlet 83 from the second exchanger can be seen at the transom 85.

Figure 5:
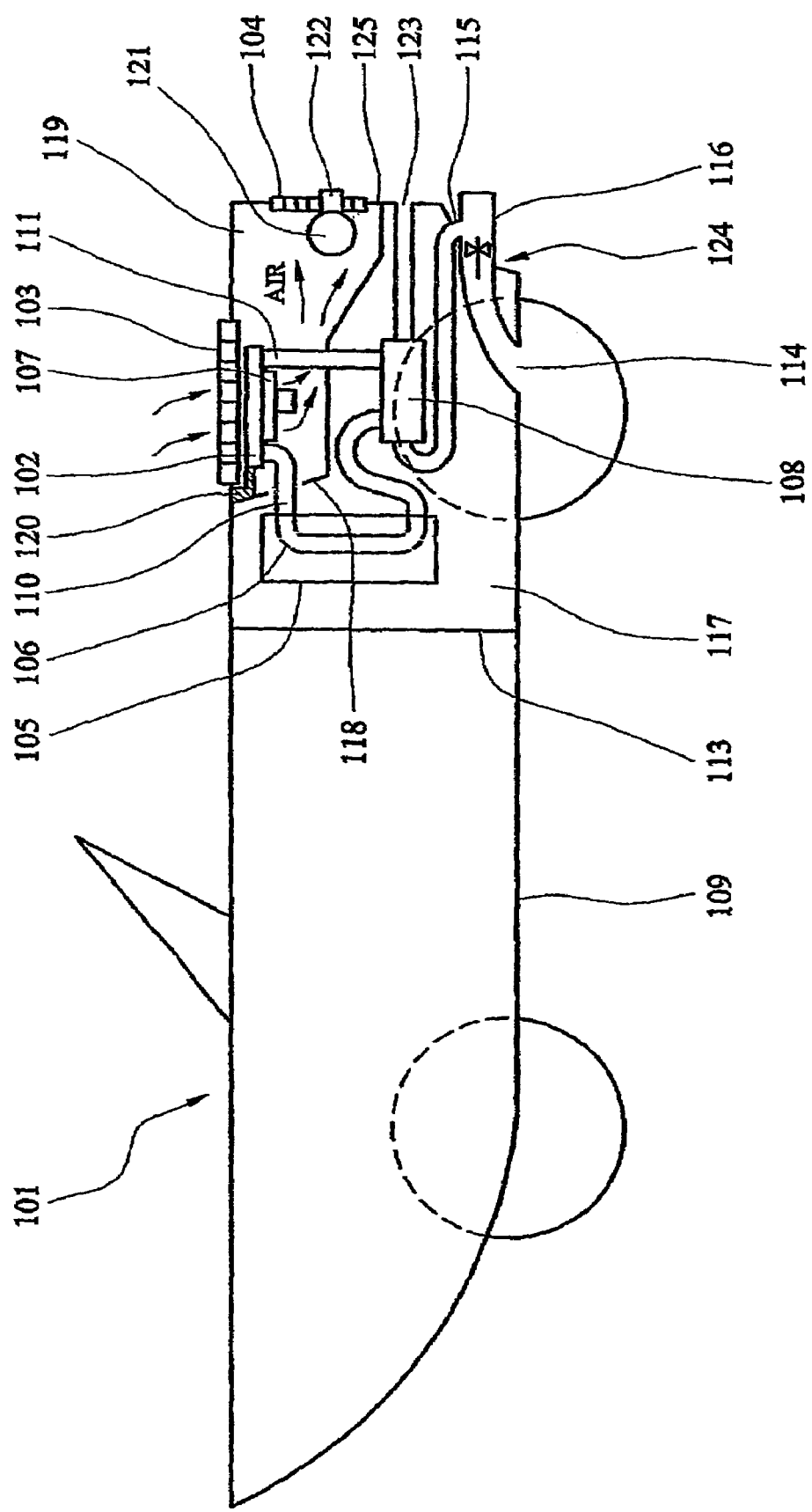
FIG. 5 is a diagrammatic side elevation of a yet further alternative layout of an amphibian with a radiator at the rear.

FIG. 5 shows a yet further amphibian where the first exchanger is located in a second compartment separate to the engine compartment. Amphibian 101 has a mid-mounted engine 105 with cooling ducting 106, located in engine compartment 117, limited by a forward bulkhead 113. First exchanger 102 is located at the top of compartment 119, which is separated from the engine by a bulkhead. As this bulkhead does not fully seal compartment 119 from engine compartment 117, it is shown as an upper bulkhead 120 and a lower bullhead 118. Outside air passes into compartment 119 through grille 103, as shown by arrows; and is drawn through exchanger 102 by one or more fans 107, then exhausted past silencer 121 and out of the vehicle through grille 104. In this embodiment, exchanger 108 is located in compartment 117. Hoses or pipes 110, 111 connect the engine to the first exchanger, and the first exchanger to the second, in a similar fashion to previous embodiments. However, in this case, engine 105 has a separate cooling system comprising further air intakes and fans (not shown). These blow air through compartment 117, and out through compartment 119. It is important that first exchanger 102 should have an intake of ambient temperature air, rather than pre-warmed air from engine compartment 117; so upper bulkhead 120 is arranged to seal off the intake to exchanger 102 from the exhaust air from compartment 117. External water for the second exchanger 108 is first drawn into the hull 109 through the jet drive intake 114 below the hull, then tapped off from the pressurized side of the jet drive 124 through water inlet pipe 115 in the jet outlet duct 116. External water exits the second heat exchanger 108 out a hull water outlet 123. An alternative representation of the piping through the second exchanger is shown as compared to the FIG. 4 embodiment, to clarify the external water flow through the second exchanger.

It will be appreciated that further modifications to the layout of components may also be made as required without departing from the spirit and scope of the invention. In particular, it may be found convenient to fit radiator 102 at a different angle, or in a yet further position, to that shown. Exhaust silencer 121 may also be located ahead of radiator 102.

The invention claimed is:

1. A planing amphibious vehicle comprising:
    a hull;
    an engine mounted in the rear two-thirds of the hull;
    a water jet drive path within the planing amphibious vehicle in which water travels from a jet drive intake, through a marine jet chive, to a jet drive outlet; and
    an engine cooling system, the system comprising:
        liquid coolant ducting for circulating a coolant around the engine;

a first heat exchanger connected to the liquid coolant ducting;

a path for outside air for the first heat exchanger within the planing amphibious vehicle in which air travels from an air inlet, through the first heat exchanger, to an air outlet;

a second heat exchanger disposed remotely from the first heat exchanger and connected to the liquid coolant ducting; and a path for external water for the second heat exchanger within the planing amphibious vehicle in which water travels from a water inlet pipe, through the second heat exchanger, to a hull water outlet.

2. A planing amphibious vehicle according to claim 1, characterized in that the air inlet is provided at a front of the planing amphibious vehicle, above a static water line.

3. A planing amphibious vehicle according to claim 2, characterized in that the air inlet is provided with a closure means so that it may be closed when the planing amphibious vehicle is on water.

4. A planing amphibious vehicle according to claim 3, characterized in that the closure means comprises one or more hinged flaps.

5. A planing amphibious vehicle according to claim 1, characterized in that the engine of the planing amphibious vehicle is mid-mounted.

6. A planing amphibious vehicle according to claim 1, characterized in that the external water for the second exchanger is arranged to be drawn into the planing amphibious vehicle by a cooling water pump.

7. A planing amphibious vehicle according to claim 1, characterized in that the first heat exchanger is located in a second compartment separate to an engine compartment.

8. A planing amphibious vehicle according to claim 7, characterized in that the second heat exchanger is located in the second compartment separate to the engine compartment.

9. A planing amphibious vehicle according to claim 8, characterized in that at least one exhaust silencer is located in the second compartment separate to the engine compartment.

10. A planing amphibious vehicle according to claim 7, characterized in that at least one exhaust silencer is located in the second compartment separate to the engine compartment.

11. A planing amphibious vehicle according to claim 1, characterized in that the first heat exchanger and the second heat exchanger are simultaneously operable independent of water depth when the planing amphibious vehicle is planing.

12. A planing amphibious vehicle according to claim 1, wherein the second heat exchanger is mounted to the rear of the engine.

13. A planing amphibious vehicle according to claim 1, wherein the water inlet pipe is disposed on the water jet drive path.

14. A planing amphibious vehicle according to claim 1, wherein the water inlet pipe is disposed on the water jet drive path at a downstream and remote position from the marine jet drive.

15. A planing amphibious vehicle according to claim 1, wherein the water inlet pipe is disposed in the rear half of the vehicle at a remote position from the marine jet drive.

16. A planing amphibious vehicle according to claim 1, further comprising a first compartment and a second compartment, wherein the first heat exchanger is disposed in the first compartment within the hull, and the second heat exchanger and the engine are disposed in the second compartment within the hull, wherein the first heat exchanger is remote from the second heat exchanger.

17. A planing amphibious vehicle according to claim 1, wherein the water inlet pipe is disposed on at least one of the water jet drive path at a remote position from the marine jet drive and a rear of the hull of the planing amphibious vehicle.

18. A planing amphibious vehicle according to claim 17 further comprising a means for drawing external water into the water inlet pipe.

19. A planing amphibious vehicle according to claim 18, wherein the water inlet pipe is disposed on the water jet drive path remote from the marine jet drive such that pressurized water from the water jet drive path is forced into the water inlet pipe.

20. A planing amphibious vehicle according to claim 18, wherein a pump draws water into the water inlet pipe.

21. A planing amphibious vehicle according to claim 17, wherein the hull water outlet is disposed on the water jet drive path at a remote position upstream from the marine jet drive.

22. A planing amphibious vehicle according to claim 21, wherein a pump draws external water into the water inlet pipe, and wherein the water inlet pipe is disposed on the rear two thirds of the hull of the planing amphibious vehicle at a remote position from the jet drive intake.

23. A planing amphibious vehicle according to claim 1, wherein the first heat exchanger and the second heat exchanger are disposed within the hull of the planing amphibious vehicle.

* * * * *